United States Patent [19]

Yada et al.

[11] 3,900,463

[45] Aug. 19, 1975

[54] PROCESS FOR PREPARING ALKALI CARBOXYMETHYL CELLULOSE

[75] Inventors: Akira Yada, Uji; Yuji Hori, Kyoto, both of Japan

[73] Assignee: Dai-Ichi Kogyo Seiyaku Co. Ltd., Osaka, Japan

[22] Filed: Aug. 13, 1971

[21] Appl. No.: 171,780

Related U.S. Application Data

[63] Continuation of Ser. No. 884,346, Dec. 11, 1969, abandoned.

[30] Foreign Application Priority Data

Dec. 14, 1968 Japan................................ 43-91766
July 9, 1969 Japan................................ 44-54680

[52] U.S. Cl. ................. 260/231 CM; 106/197 CM
[51] Int. Cl.² ......................................... C08B 11/00
[58] Field of Search ....... 260/231 CM; 106/197 CM

[56] References Cited
UNITED STATES PATENTS

| 1,682,294 | 8/1928 | Lilienfeld............................ 260/231 |
| 1,884,629 | 10/1932 | Dreyfus................................ 260/231 |
| 2,476,331 | 7/1949 | Swinehart et al..................... 260/231 |
| 3,284,441 | 11/1966 | Bishop et al........................ 260/231 |
| 3,347,855 | 10/1967 | Nelson................................ 260/231 |
| 3,361,740 | 1/1968 | Sommers............................. 260/231 |

FOREIGN PATENTS OR APPLICATIONS

| 148,675 | 10/1952 | Australia............................ 260/231 |
| 879,524 | 10/1961 | United Kingdom................. 260/231 |

Primary Examiner—Ronald W. Griffin
Attorney, Agent, or Firm—Bierman & Bierman

[57] ABSTRACT

A process for preparing alkali carboxymethyl cellulose having a uniform distribution of the degree of substitution which comprises treating cellulose with an etherifying agent selected from the group consisting of alkali monochloroacetate and lower alkyl monochloroacetate in the presence of a solvent system consisting of at least one organic solvent and water until the uniform distribution of the etherifying agent into the cellulose is attained, the etherifying agent being used in 0.4 to 2.0 mol per cellulose glucose anhydride unit, and adding an alkali to the resultant mixture, the alkali being used in not less than an equimolar amount to alkali monochloroacetate or not less than a twice molar amount to lower alkyl monochloroacetate, followed by treatment at a temperature from room temperature to reflux temperature until the etherification is completed.

10 Claims, No Drawings

PROCESS FOR PREPARING ALKALI CARBOXYMETHYL CELLULOSE

This application is a continuation of application Ser. No. 884,346, filed Dec. 11, 1969, now abandoned.

The present invention relates to a process for preparing alkali carboxymethyl cellulose showing a uniform distribution of the degree of substitution.

For the production of alkali carboxymethyl cellulose (hereinafter referred to as "CMC"), there have heretofore been adopted two kinds of processes, i.e. (A) the socalled "dough" process in which the etherification of cellulose is carried out in the heterogeneous system of solid phase in water and (B) the so-called "slurry" process in which the etherification is effected in the slurry state in a mixture consisting of water and at least one organic solvent. The latter slurry process involves specifically the following two processes: (a) a process of preparing first uniform alkali cellulose from cellulose and an alkali hydroxide solution in water or a mixture consisting of water and at least one organic solvent and then adding a solution of monochloroacetic acid in water, at least one organic solvent or a mixture of them as an etherifying agent thereto and (b) a process of effecting the alkali cellulose formation simultaneously with the etherification by adding cellulose to a solution of alkali hydroxide and monochloroacetic acid in a mixture of water and at least one organic solvent. Monochloroacetic acid soluble in an organic solvent has been used in both of these processes, but there has hardly been used alkali monochloroacetate because of its insolubility in an organic solvent, its inferiority in the technical effect and its expensiveness. In these known slurry processes, the following drawbacks are seen: (1) although uniform alkali cellulose formation has been considered to occur in the step of treating cellulose with alkali hydroxide, the sufficient destruction of cellulose does not take place in truth; (2) crystalline structures remaining in the starting cellulose are difficultly etherified in uniformity; and (3) when monochloroacetic acid as an etherifying agent is contacted with alkali cellulose, the etherification rate is superior to the penetration rate and so these rates are not favorably harmonious. Thus, the etherification is accelerated locally, and the obtained CMC possess an uneven distribution of the degree of substitution to form a CMC solution containing gelatinous or granular substances which shows a large thixotropy. The viscosity of such CMC solution increases with the lapse of time finally to gelatination. When it is used, for instance, for screen printing, sizing works or film formation, there may practically occur many troubles including ill fluidity, stopping-up of screen meshes and film cracking.

In order to overcome the said defects present in the known slurry process, the present inventors have made various attempts and now completed the present invention, by which CMC showing a uniform distribution of the degree of substitution is provided.

According to the present invention, such CMC is prepared by treating cellulose with an etherifying agent in the presence of a solvent system consisting of at least one organic solvent and water until the uniform distribution of the etherfying agent into the cellulose is attained and then treating the resultant mixture with an alkali until the etherification is completed.

As the starting cellulose, there may be used wood pulp, linter pulp or the like, favorably crushed in 20 to 100 mesh.

In the first step, cellulose is treated with an etherifying agent. Examples of the etherifying agent are alkali monochloroacetate (e.g. sodium monochloroacetate, calcium monochloroacetate, potassium monochloroacetate, ammonium monochloroacetate) and lower alkyl monochloroacetate (e.g. methyl monochloroacetate, ethyl monochloroacetate, propyl monochloroacetate, isopropyl monochloroacetate, butyl monochloroacetate). An amount of the etherifying agent for use is determined by the efficiency for etherification, and a suitable amount of the etherifying agent for preparing the CMC product showing an ordinary degree of etherification is 0.4 to 2.0 mol per cellulose glucose anhydride unit.

The treatment in the first step is made for diffusing and dispersing uniformly the etherifying agent into the micelle of cellulose. For attaining such object, it is recommended to use as the medium a solvent system consisting of at least one organic solvent and water, the amount of water satisfying the following inequality:

$$\frac{1}{X} \times \frac{72}{89} \leq Y \leq \frac{1}{X} \times \frac{792}{223}$$

wherein Y is the ratio of the weight of water to that of the etherifying agent and X is the mol number of the etherifying agent per cellulose glucose anhydride unit and the amount of the organic solvent being not less than that of water. More favorably, the amount of water may satisfy the following inequality:

$$\frac{1.5}{X} \leq Y \leq \frac{2.5}{X}$$

wherein X and Y are each as defined above. A preferable amount of the organic solvent in the solvent system is 4 to 9 folds that of water. Examples of the organic solvent are aliphatic alcohols having 2 to 4 carbon atoms (e.g. ethanol, n-propanol, isopropanol, n-butanol, isobutanol, sec-butanol, tert-butanol, allyl alcohol, crotyl alcohol, methyl vinyl carbinol, propargyl alcohol, ethylene glycol, propylene glycol, 3-butene-1,2-diol, glycerol), glycol monoalkyl ethers having alkyl group of not more than 4 carbon atoms (e.g. ethylene glycol monomethyl ether, ethylene glycol monoethyl ether, ethylene glycol monopropyl ether, diethylene glycol monoethyl ether), aromatic hydrocarbons (e.g. benzene, toluene, xylene, ethylbenzene, cumene, n-butylbenzene, n-amylbenzene), dialkyl ketones having alkyl group of not more than 4 carbon atoms (e.g. acetone, diethyl ketone, di-n-propyl ketone, diisopropyl ketone, diisobutyl ketone, methyl ethyl ketone, methyl propyl ketone), mixtures of organic solvents as mentioned above (e.g. acetone-ethanol, isopropanol-ethanol, benzene-ethanol, acetonetoluene), etc.

The treatment is usually carried out while stirring at a temperature below 40°C, and the uniform diffusion and dispersion are achieved within about 1 hour. Some examples of the treatment procedure are as follows: (1) treatment of cellulose with the said solvent system containing the etherifying agent; (2) treatment of cellulose with the said solvent system, followed by treatment of the resulting mixture with the etherifying agent; (3) treatment of cellulose with the etherifying agent, followed by treatment of the resulting mixture with the said solvent system; and (4) treatment of cellulose with the organic solvent, follow by treatment of the resulting mixture with a dispersion of the etherifying agent in water.

In the second step, an alkali is added to the resulting mixture obtained in the first step, and the etherification is effected.

As the alkali, there is normally used alkali hydroxide (e.g. sodium hydroxide, potassium hydroxide). It may be used in solid but favorably in an aqueous solution. The amount of the alkali is varied with the kind of the etherifying agent. When the etherifying agent is alkali monochloroacetate, the alkali is employed in not less than an equimolar amount to the etherifying agent. In the case of lower alkyl monochloroacetate, the amount of the alkali is not less than a twice molar amount to the etherifying agent.

In ordinary cases, the alkali addition is effected gradually below 40°C, favorably at a lower temperature. After addition of the alkali, the temperature is elevated to 60° to 80°C, and the etherification is carried out for several hours. A suitable amount of the solvent system covering the whole steps is not less than 2 times, preferably 6 to 16 times, that of the cellulose for easy stirring.

By the process of this invention, the etherifying agent such as alkali monochloroacetate insoluble in a solvent system and known as improper for the slurry method or lower alkyl monochloroacetate substantially insoluble in water is first diffused and dispersed by the aid of the solvent system uniformly in cellulose without production of alkali cellulose, and then the alkali is added thereto for proceeding the etherification to give the CMC containing few gelatinous substances and having little thixotropy. Thus, setting a step for the alkali cellulose formation is not required and it is unnecessary to refrain local reactions by keeping the reaction mixture at a very lower temperature. Pulps of bigger crystalline structure such as linter pulp can be used as the starting materials. The use of such an organic solvent (e.g. benzene, acetone, isopropanol) as being insoluble with an alkali hydroxide is possible.

The use of lower alkyl monochloroacetate as the etherifying agent in this invention has some merits in comparison with the use of alkali monochloroacetate. Such merits are enumerated as follows:

1. Since lower alkyl monochloroacetate has better solubility in the solvent and is more active than alkali monochloroacetate, the sufficient diffusion and penetration into the inside of cellulose can be attained especially in case of using a stongly hydrophilic organic solvent. Shorter time suffices for satisfactory diffusion and penetration, and full effect can be attained with no influence over the concentration of the solvent system;

2. Since the ester part of lower alkyl monochloroacetate is first hydrolyzed by contacting with an alkali and then gradually the etherification occurs with by-production of alkali chloride, the efficiency of the etherifying agent increases together with few by-production of alkali glycolate and so the purification of the product is simplified;

3. Since lower alkyl monochloroacetate is dispersed uniformly in the form of alkali monochloroacetate in the step for etherification, there can be obtained CMC having a more uniform distribution of the degree of substitution; and 4. Since the amount of the solvent system used in the whole steps is smaller, the recovery loss of the organic solvent which is one of the defects inherently residing in the slurry process decreases and the cost-down of the product is achieved.

As stated above, CMC obtained by the present invention contains few gelatinous substances and has properties of small thixotropy owing to uniform substitution. For determining the uniformity of the degree of substitution of CMC, there have heretofore been adopted a method of observing the aqueous CMC solution visually and tactually and a method of deciding $n$ in the expression: $F^n = \gamma G$ wherein F is a shear stress, G is a shearing rate, $\gamma$ is a rate for unit stress and $n$ is a constant. However, these methods are practically improper, because the former is only qualitative and the latter requires strict measuring conditions. In the process of this invention, there is suitably adopted a method of deciding the ratio of gelatinous substance (hereinafter referred to as "PA") separated by subjecting the aqueous CMC solution to centrifuge, and it is confirmed that this deciding method is appropriate from measurement of the degree of etherification and measurement due to general flux expressions.

1. The ratio of gelatinous substances (i.e. PA) is calculated as follows:

About 1% aqueous CMC solution (100 g) is measured precisely, and about 10 g thereof is put in a centrifugal tube. This sample is centrifugalized at 20,000 rpm for 10 minutes to separate in two phases consisting of the upper clear solution and the gelatinous part. The gelatinous part is taken out, transmitted onto a glass filter with 100% methanol (about 100 ml), dried at 105°C for 4 hours and its weight (a) is measured. Thus, the ratio of gelatinous substance (PA) is calculated from the following formula:

$$PA = \frac{a \times \frac{100}{\text{weight of liquid provided for centrifugalization}}}{\text{weight of CMC collected}} \times 100 \, (\%)$$

2. There are shown $n$ of the general flux expression, fluidity and appearance in the following table. As $n$ increases, the thixotropy of CMC become larger owing to uneven substitution and more gelatinous substances are contained therein. Standard of judgement on the uniformity of the substitution is hereafter as follows: Uniform substitution of CMC is considered as $$n \leq 1.1500$$

| Sample (1 % aqueous solution) | n | Fluidity | Appearance |
| --- | --- | --- | --- |
| Glycerin | 1.0070 | Newtonian flow | No gel, no glanule |
| Castor oil | 1.0001 | Newtonian flow | No gel, no granule |
| Sodium alginate | 1.0283 | Pseudoplastic flow | No gel, no granule |
| CMC 1 | 1.0650 | Pseudoplastic flow | No gel, no granule |
| CMC 2 | 1.1580 | Pseudoplastic flow | Slight granules |

-Continued

| Sample (1 % aqueous solution) | n | Fluidity | Appearance |
|---|---|---|---|
| CMC 3 | 1.2350 | Small thixotropy | Rather many granules |
| CHC 4 | 1.4388 | Large thixotropy | Much more granules, gelatinous substance |

Note:
Method of measuring n
A 1 % aqueous solution of each sample was prepared, and its shear stress for various shearing rates was measured with a B type viscosimeter (a product of Tokyo Keiki Seizosho Co., Ltd.). So, n was calculated from the said general flux expression.

3. Still, there were measured the degree of substitution of 1% aqueous CMC solution, the degree of substitution of the upper clear solution after centrifugalization, the etherified degree of the gelatinuous substance after centrifugalization, the ratio of the gelatinous substance (PA) after centrifugalization and $n$ value in the general flux expression. Results of them are shown in the following table.

| Test No. | 1 | 2 | 3 | 4 | 5 | 6 | 7 | 8 | 9 |
|---|---|---|---|---|---|---|---|---|---|
| Etherified degree of 1 % aqueous CMC solution | 0.66 | 0.65 | 0.66 | 0.66 | 0.82 | 0.82 | 0.85 | 0.53 | 0.54 |
| Etherified degree of the upper clear solution after centrifugalization | 0.68 | 0.67 | 0.67 | 0.66 | 0.85 | 0.83 | 0.85 | 0.56 | 0.55 |
| Etherified degree of the gelatinous substance after centrifugalization | 0.53 | 0.55 | 0.58 | 0.64 | 0.65 | 0.78 | 0.82 | 0.45 | 0.52 |
| Ratio of the gelatinous substance (PA) after centrifugalization | 0.95 | 0.85 | 0.67 | 0.15 | 1.23 | 0.78 | 0.12 | 1.50 | 0.20 |
| n of the general expression (2) | 1.1748 | 1.1573 | 1.1253 | 1.0260 | 1.2298 | 1.1485 | 1.0205 | 1.2805 | 1.0358 |

As the substitution of CMC is more uniform, the difference between the etherified degree of the upper clear solution and that of the gelatinous substance in the above table is smaller and the ratio of the gelatinous substance (PA) and $n$ value of the general flux expression are also smaller. In that case, PA and $n$ show almost a straight relation. When $n = 1.1500$, $PA = 0.80$.

From the said items (1), (2) and (3), judgement on the uniformity of the substitution of CMC can be obtained by the ratio of the gelatinous substance (PA) after centrifugalization of the tested solution. So, a sample of below 0.8 of PA measured under conditions (1) is determined to be substituted uniformly.

When the process of this invention is effected using alkali monochloroacetate as the etherifying agent, alkali monochloroacetate itself is usually employed. Alternatively, monochloroacetic acid and an alkali may be employed so as to form alkali monochloroacetate. In this case, however, the excessive use of the alkali should be avoided.

The amount of water (Y) before the alkali addition indicates the total amount of water contained in the system before the alkali addition including the amounts of water contained in the starting cellulose, in the solvent system and in an aqueous solution of alkali monochloroacetate.

Still, the following types of technique are involved in this invention:

a. A method of using the solvent system wherein the concentration of the organic solvent is low for dispersing the etherifying agent, adding the solvent system wherein the concentration of the organic solvent is high to the resulting mixture and carrying out the etherification in the presence of an alkali so as to attain a high degree of substitution;

b. A method of adding an oxidizing agent or an excessive amount of alkali in or after the etherification due to the alkali addition to lower the viscosity of CMC produced;

c. A method of adding water or the solvent system in which the concentration of the organic solvent is low after the etherification to change the physical state of CMC produced;

d. To apply the same techniques in the production of other CMC derivatives such as carboxymethyl hydroxyalkyl cellulose or carboxymethyl alkoxy cellulose; and e. To apply the process of the invention in a way of multiple steps in the production of highly etherified CMC.

Presently-preferred and practical embodiments of the present invention are illustratively shown in the following examples.

The following terms used in these examples have the meanings as defined below:

a. Parts and % represent parts by weight and weight %, repectively.

b. DS represents the mole number of the substituted carboxymethyl group per cellulose glucose anhydride unit.

c. AM represents the efficiency of an etherifying agent:

$$DS \text{ found}/TDE \times 100 \ (\%)$$

d. TDE represents the mole number of alkali monochloroacetate or lower alkyl monochloroacetate used in the reaction per cellulose glucose anhydride unit.

e. PA represents the weight % of gelatious substance collected by centrifugalization.

f. MCA represents monochloroacetic acid, and Na-MCA represents sodium monochloroacetate.

g. The impurity included in the starting pulp is water.

h. Amounts of monochloroacetic acid, alkali salt, lower alkyl monochloroacetate and sodium hydroxide are shown in net weight, respectively.

EXAMPLE 1.

Into a mixer containing 99.9% isopropanol (1000 parts) and water (100 parts), there is added pulp (purity, 90%; 100 parts), and the resultant mixture is stirred at 25°C for 5 minutes. While stirring, solid Na-MCA (77.6 parts) are added in about one minute to the mixture, which is then stirred at 25° to 30°C for 60 minutes. To the resultant slurry, there is dropwise added 40% aqueous sodium hydroxide solution (80 parts) uniformly in 60 minutes at 30° to 35°C. After addition of the sodium hydroxide solution, the reaction system is kept at 70°C for 2 hours. The reaction mixture is neutralized with glacial acetic acid, washed with 80% methanol 3 times and dried. Properties of the resulting purified CMC are shown as follows: DS, 0.81; AM, 67.5; 1% viscosity, 215 cps; PA, 0.32.

EXAMPLE 2.

Into a mixer, there are introduced a solution of Na-MCA (77.6 parts) in water (150 parts) and pulp (purity, 90%; 100 parts). The resultant mixture is stirred at 25° to 30°C for 30 minutes to form a slurry. As diluent, 99.9% isopropanol (1000 parts) is added to the mixture, which is then stirred at the same temperature for 30 minutes. Similarly treated as in Example 1, there is obtained purified CMC. Properties of the purified CMC are as follows: DS, 0.80; AM, 66.6; 1% viscosity, 200 cps; PA, 0.35.

EXAMPLE 3.

Into a mixer, there are introduced 95.0% ethanol (600 parts), benzene (300 parts) and water (50 parts), and the resultant mixture is stirred at 25°C for 1 minute. Pulp purity, 90%; (100 parts) is added to the mixture, which is stirred at 25° to 30°C for 15 minutes. To the resultant slurry, there is added a solution of MCA (52.5 parts) and sodium bydroxide (22.2 parts) in water (70 parts) in about a minute, and the resultant mixture is stirred at 25° to 30°C for 60 minutes. While keeping the system at 30° to 35°C, 40% aqueous sodium hydroxide solution (120 parts) is added dropwise in 60 minutes, and the reaction system is warmed at 65°C. Similarly treated as in Example 1, there is obtained purified CMC. Properties of the obtained CMC are as follows: DS, 0.75; AM, 75; 1% viscosity, 255 cps; PA 0.48.

EXAMPLES 4–14.

Similarly treated as in Example 1, there are obtained some CMC(s) having properties shown in the following table by adopting the corresponding prescriptions.

There are shown some control cases wherein an amount of water violating the scope of the inequality above described is used.

| Ex. No. | Sorts of cellulose | Solvent system before the alkali addition | | | Na-MCA | | | Water amount for dispersing Na-MCA (ratio for Na-MCA) | Sodium hydroxide | | Reaction condition | Properties | | | |
|---|---|---|---|---|---|---|---|---|---|---|---|---|---|---|---|
| | | Organic solvent | Amount of solvent system (part) | Concentration of organic solvent (%) | TDE | Amount (part) | Form of addition | | Amount (part) | Form of addition | | DS | AM | 1% viscosity (cps) | PA |
| 4 | Purified pulp (100 parts) | Isopropanol | 260 | 50.0 | 0.8 | 51.7 | Solid | 2.71 | 20 | 40% aq. soln. | 70°C; 3 hrs | 0.45 | 56.2 | 1360 | 0.78 |
| 5 | Purified pulp (100 parts) | Isopropanol | 360 | 50.0 | 1.2 | 77.6 | Solid | 2.45 | 30 | 40% aq. soln. | 70°C; 3 hrs | 0.66 | 55.0 | 365 | 0.73 |
| 6 | Purified pulp (100 parts) | Isopropanol | 400 | 70.0 | 0.8 | 51.7 | Solid | 2.52 | 20 | 40% aq. soln. | 70°C; 3 hrs | 0.51 | 63.8 | 585 | 0.59 |
| 7 | Purified pulp (100 parts) | Isopropanol | 900 | 88.0 | 0.8 | 51.7 | Solid | 2.29 | 20 | 40% aq. soln. | 70°C; 3 hrs | 0.60 | 75.0 | 460 | 0.53 |
| 8 | Purified pulp (100 parts) | Isopropanol | 950 | 88.0 | 1.2 | 77.6 | Solid | 1.60 | 30 | 40% aq. soln. | 70°C; 3 hrs | 0.86 | 71.4 | 200 | 0.42 |
| 9 | Purified pulp (100 parts) | Isopropanol | 800 | 88.0 | 0.4 | 26.0 | Solid | 4.08 | 12 | 40% aq. soln. | 70°C; 3 hrs | 0.32 | 80.0 | 1550 | 0.79 |
| 10 | Purified pulp (100 parts) | Isopropanol | 900 | 88.0 | 0.8 | 51.7 | Solid | 2.29 | 20 | Solid | 70°C; 3 hrs | 0.59 | 73.8 | 435 | 0.65 |
| 11 | Linter pulp (100 parts) | Isopropanol | 900 | 88.0 | 0.8 | 51.7 | Solid | 2.29 | 20 | 40% aq. soln. | 70°C; 3 hrs | 0.60 | 75.0 | 1120 | 0.80 |
| 12 | Linter pulp (100 parts) | Benzene | 950(1) | 84.2(2) | 0.8 | 51.7 | Solid | 3.10 | 20 | 40% aq. soln. | 60°C; 3 hrs | 0.59 | 73.8 | 343 | 0.72 |
| 13 | Linter pulp (100 parts) | Benzene | 1300(3) | 92.3(1) | 0.8 | 51.7 | 50% aq. soln. | 3.12 | 20 | 40% aq. soln. | 60°C; 3 hrs | 0.59 | 73.8 | 348 | 0.73 |
| 14 | Linter pulp (100 parts) | Ethanol | 900 | 90.0 | 0.8 | 51.7 | Solid | 1.94 | 20 | 40% aq. soln. | 70°C; 3 hrs | 0.61 | 76.3 | 380 | 0.63 |
| Control No.1 | Purified Pulp (100 parts) | Isopropanol | 320 | 88.0 | 1.2 | 77.6 | Solid | 0.51 | 30 | 40% aq. soln. | 70°C; 3 hrs | 0.80 | 66.6 | 186 | 1.29 |
| 2 | Purified pulp (100 parts) Linter | Isopropanol | 1900 | 88.0 | 1.2 | 77.6 | Solid | 3.06 | 30 | 40% aq. soln. | 70°C; 3 hrs | 0.90 | 75.0 | 113 | 0.98 |

—Continued

| Ex. No. | Sorts of cellulose | Solvent system before the alkali addition | | | Na-MCA | | | Water amount for dispersing Na-MCA (ratio for Na-MCA) | Sodium hydroxide | | Reaction condition | Properties | | | |
|---|---|---|---|---|---|---|---|---|---|---|---|---|---|---|---|
| | | Organic solvent | Amount of solvent system (part) | Concentration of organic solvent (%) | TDE | Amount (part) | Form of addition | | Amount (part) | Form of addition | | DS | AM | 1% viscosity (cps) | PA |
| 3 | pulp (100 parts) Linter | panol | 1900 | 88.0 | 1.2 | 77.6 | Solid | 3.06 | 30 | aq. soln. 40% | 70°C;3 hrs | 0.88 | 73.5 | 480 | 1.60 |
| 4 | pulp (100 parts) | Benzene | 1150(5) | 87.0(6) | 1.2 | 77.6 | Solid | 3.35 | 30 | aq. soln. 40% | 60°C;3 hrs | 0.83 | 69.2 | 195 | 0.98 |
| 5 | Purified pulp (100 parts) | Isopropanol | 100 | 50.0 | 0.8 | 51.7 | Solid | 1.16 | 20 | aq. soln. 40% | 70°C;3 hrs | 0.45 | 56.2 | 1395 | 0.81 |

Note:
(1) benzene (800 parts) and water (150 parts).
(3) benzene (1200 parts) and water (100 parts).
(5) benzene (1000 parts) and water (150 parts).
(2), (4) and (6) shown in apparent concentration.

EXAMPLES 15–18.

Similarly treated as in Example 2, there are obtained some CMC(s) having properties shown in the following table by adopting the corresponding prescriptions. There is shown one control case wherein an amount of water violating the scope of the inequality above described is used.

EXAMPLES 19–23.

Similarly treated as in Example 3, there are obtained some CMC(s) having properties shown in the following table by adopting the corresponding prescriptions. There is shown a control case wherein an amount of water violating the scope of the inequality above described is used.

| Ex. No. | Sorts of cellulose | Solvent system before the alkali addition | | | Na-MCA | | | | Water amount for dispersing Na-MCA (ratio for Na-MCA) | Sodium hydroxide | | Properties | | | |
|---|---|---|---|---|---|---|---|---|---|---|---|---|---|---|---|
| | | Organic solvent | Amount of solvent system (part) | Concentration of organic solvent (%) | TDE | Amount (part) | Water (part) | | | Amount (part) | Form of addition | DS | AM | 1% viscosity (cps) | PA |
| 15 | Purified pulp(100 parts) | Isopropanol | 600 | 99.9 | 1.2 | 77.6 | 117 | | 1.64 | 30 | 40% aq. soln. | 0.84 | 70.0 | 205 | 0.63 |
| 16 | Purified pulp(100 parts) | Isopropanol | 1400 | 95.0 | 1.0 | 65.0 | 100 | | 2.77 | 25 | 40% aq. soln. | 0.73 | 73.0 | 280 | 0.71 |
| 17 | Purified pulp(100 parts) | Ethanol | 1000 | 95.0 | 0.8 | 51.7 | 100 | | 3.10 | 20 | 40% aq. soln. | 0.62 | 77.4 | 385 | 0.78 |
| 18 | Purified pulp(100 parts) | Ethanol | 1000 | 95.0 | 1.5 | 97.0 | 150 | | 2.17 | 35 | 40% aq. soln. | 1.10 | 73.3 | 103 | 0.80 |
| Control No.6 | Purified pulp(100 parts) | Ethanol | 1300 | 90.0 | 1.5 | 97.0 | 150 | | 2.99 | 35 | 40% aq. soln. | 1.00 | 66.5 | 120 | 1.03 |

| Ex. No. | Sorts of cellulose | Solvent system before the alkali addition | | | Etherifying agent | | | Water amount for dispersing Na-MCA (ratio for Na-MCA) | Sodium hydroxide | | Properties | | | |
|---|---|---|---|---|---|---|---|---|---|---|---|---|---|---|
| | | Organic solvent | Amount of solvent system (part) | Concentration of organic solvent (%) | TDE | MCA (part) | NaOH (part) | Water (part) | | Amount (part) | Form of addition | DS | AM | 1% viscosity (cps) | PA |
| 19 | Purified pulp(100 parts) | Isopropanol | 700 | 99.9 | 1.2 | 63.0 | 26.6 | 114 | 1.60 | 30 | 40% aq. soln. | 0.85 | 70.8 | 160 | 0.45 |
| 20 | Purified pulp(100 parts) | Isopropanol | 700 | 99.9 | 0.8 | 42.0 | 17.8 | 100 | 2.27 | 20 | 40% aq. soln. | 0.57 | 71.2 | 400 | 0.68 |
| 21 | Purified pulp(100 parts) Linter | Acetone Iso- | 1000 | 95.0 | 0.8 | 42.0 | 17.8 | 150 | 4.22 | 20 | 40% aq. soln. | 0.58 | 72.5 | 385 | 0.80 |

—Continued

| Ex. No. | Sorts of cellulose | Solvent system before the alkali addition | | | Etherifying agent | | | Water amount for dispersing Na-MCA (ratio for Na-MCA) | Sodium hydroxide | | Properties | | | |
|---|---|---|---|---|---|---|---|---|---|---|---|---|---|---|
| | | Organic solvent | Amount of solvent system (part) | Concentration of organic solvent (%) | TDE | MCA (part) | NaOH (part) | Water (part) | | Amount (part) | Form of addition | DS | AM | 1% viscosity (cps) | PA |
| 22 | pulp(100 parts) | propanol | 700 | 99.9 | 1.2 | 63.0 | 26.6 | 114 | 1.61 | 30 | aq. soln. 40% | 0.82 | 68.3 | 865 | 0.78 |
| 23 | Purified pulp(100 parts) | Ethanol | 600 | 95.0 | 1.0 | 52.5 | 22.2 | 100 | 2.16 | 25 | aq. soln. 40% | 0.70 | 70.0 | 215 | 0.60 |
| Control No.7 | Purified pulp(100 parts) | Ethanol | 1000 | 90.0 | 1.0 | 52.5 | 22.2 | 150 | 4.00 | 25 | aq. soln. 40% | 0.72 | 72.0 | 193 | 0.95 |

EXAMPLE 24.

Into a mixer containing 99.9% isopropanol (1000 parts) and water (100 parts), there is added pulp (purity, 90%; 100 parts), and the resultant mixture is stirred at 25°C for 5 minutes. With stirring, solid isopropyl monochloroacetate (91 parts) is added in about a minute to the mixture, which is stirred at 25° to 30°C for 60 minutes. To the resultant slurry while kept at 30° to 35°C, there is dropwise added 40% aqueous solution (160 parts) of sodium hydroxide uniformly in 60 minutes. After finishing the addition of the sodium hydroxide solution, the temperature in the system is elevated to 70°C, and the reaction system is kept for 2 hours. The reaction mixture is neutralized with glacial acetic acid, washed with 80% methanol 3 times and dried. Properties of the resulting purified CMC are as follows: DS, 0.85; AM, 70.8; 1% viscosity, 150 cps; PA, 0.27.

EXAMPLE 25.

The reaction is effected similarly as in Example 24 except the applications of methyl monochloroacetate (60.3 parts) and 40% aqueous solution (120 parts) of sodium hydroxide in lieu of isopropyl monochloroacetate (91 parts) and 40% aqueous solution (160 parts) of sodium hydroxide, respectively. Properties of the resulting purified CMC are as follows: DS, 0.70; AM, 70; 1% viscosity, 165 cps; PA, 0.31.

EXAMPLE 26.

The reaction is effected similarly as in Example 24 except the applications of n-propyl monochloroacetate (114 parts) and 40% aqueous solution (180 parts) of sodium hydroxide in lieu of isopropyl monochloroacetate (91 parts) and 40% aqueous solution (160 parts) of sodium hydroxide, respectively. Properties of the resulting purified CMC are as follows: DS, 1.06; AM, 70.7; 1% viscosity, 106 cps; PA, 0.23.

EXAMPLE 27.

Into a mixer, there are introduced pulp (purity, 90%, 100 parts) and ethyl monochloroacetate (68 parts), and the resultant mixture is stirred at 25°C for 5 minutes. To this mixture, there are added 95% ethanol (600 parts), benzene (300 parts) and water (100 parts) in 5 minutes, and the resultant mixture is stirred at 25° to 30°C for 15 minutes. To this system, a solution of sodium hydroxide (60 parts) in water (90 parts) is added in about 30 minutes, and the mixture is stirred at 65°C for 3 hours. Similarly treated as in Example 1, there is obtained purified CMC. Properties of the purified CMC are as follows: DS, 0.80;; AM, 80; 1% viscosity, 180 cps; PA, 0.38.

Still, there are shown some comparing experiments according to known methods.

EXPERIMENT 1.

A mixture of 99.9% isopropanol (1000 parts) and pulp (purity, 90%; 100 parts) is stirred sufficiently in a mixer, and 40% aqueous sodium hydroxide solution (120 parts) is added in about a minute to the mixture, which is aged at 25° to 30°C for 30 minutes. A solution of MCA (52.2 parts) in isopropanol (52.2 parts) is added dropwise in about 15 minutes at 30° to 40°C to the mixture. The temperature in the system is elevated to 70°C and the reaction system is kept for 3 hours. The reaction mixture is neutralized with glacial acetic acid, and the product is collected by filtration. The product is washed with 80% methanol three times and dried. Properties of the resulting purified CMC are as follows: DS, 0.73; AM, 73; 1% viscosity, 50 cps; PA, 0.95. It is well soluble in water, but fibrous unsubstituted parts and gelatinous parts are conspicuous.

EXPERIMENTS 2–6.

The reactions are effected similarly as in Experiment 1, varying concentrations and amounts of solvents, reaction temperatures and amounts of etherifying agents. Results are shown in the following table.

| Experiment No. | 2 | 3 | 4 | 5 | 6 |
|---|---|---|---|---|---|
| Sorts of cellulose | Wood pulp | Wood pulp | Wood pulp | Wood pulp | Linter pulp |
| Amount of cellulose (part) | 100 | 100 | 100 | 100 | 100 |
| Organic solvent | Isopropanol | Isopropanol | Isopropanol | Isopropanol | Isopropanol |
| Concentration (%) of solvent system | 100 | 88 | 100 | 88 | 88 |

—Continued

| Experiment No. | 2 | 3 | 4 | 5 | 6 |
|---|---|---|---|---|---|
| Amount (part) of solvent system | 402.5 | 1000 | 1000 | 1000 | 1000 |
| Conc. (%) of NaOH for alkali cellulose formation | 40 | 40 | 40 | 30 | 40 |
| Amount (part) of NaOH for alkali cellulose formation | 120 | 95 | 175 | 112 | 120 |
| Etherifying agent | MCA | MCA | MCA | Na-MCA | MCA |
| TDE of etherifying agent | 1.0 | 0.8 | 1.5 | 1.2 | 1.0 |
| Amount (part) of etherifying agent | 52.5 | 42.0 | 78.7 | 78.0 | 52.5 |
| Temperature (°C) in alkali cellulose formation | 30 | 30 | 30 | 30 | 30 |
| Period (minute) for aging | 30 | 30 | 30 | 30 | 30 |
| Temperature (°C) for MCA additon | below 40 | below 40 | below 40 | below 40 | below 40 |
| Period (minute) for MCA addition | 15 | 15 | 15 | 15 | 15 |
| Temperature (°C) for etherification | 70 | 70 | 70 | 70 | 70 |
| Period (hour) for etherification | 3 | 3 | 3 | 3 | 3 |
| Properties of CMC — DS | 0.74 | 0.60 | 1.05 | 0.80 | 0.69 |
| AM | 74 | 75 | 70 | 67 | 69 |
| 1% viscosity(cps) | 53 | 110 | 40 | 80 | 550 |
| PA | 0.92 | 1.45 | 0.81 | 1.23 | 2.88 |

EXPERIMENTS 7–12.

The reactions are effected similarly as in Experiment 1, using various solvents. Results are shown in the following table.

EXPERIMENT 13.

Pulp (purity, 90%; 100 parts) is dipped in 18% aqueous sodium hydroxide solution at 20°C for 60 minutes. The dipped pulp is compressed in 2.50 folds by weight

| | Experiment No. | 7 | 8 | 9 | 10 | 11 | 12 |
|---|---|---|---|---|---|---|---|
| Cellulose | Sorts | Wood pulp | Linter pulp | Wood pulp | Wood pulp | Wood pulp | Wood pulp |
| | Amount (part) | 100 | 100 | 100 | 100 | 100 | 100 |
| Solvent system | Organic solvent | Benzene | Benzene | Ethanol | Ethanol Benzene | Ethanol Benzene | Ethanol Benzene |
| | Conc.(%)[1] | 90 | 94.8 | 90.0 | 90.0 | 90.0 | 90.0 |
| | Amount (part)[2] | 1000 | 950 | 1000 | 1000 | 1000 | 1000 |
| NaOH for alkali cellulose formation | Conc. (%) | 40 | 40 | 40 | 40 | 40 | 40 |
| | Amount (part) | 120 | 120 | 120 | 120 | 95 | 95 |
| Etherifying agent | Name | MCA | MCA | MCA | MCA | MCA | Na-MCA |
| | TDE | 1.0 | 1.0 | 1.0 | 1.0 | 0.8 | 1.2 |
| | Amount (part) | 52.5 | 52.5 | 52.5 | 52.5 | 42.0 | 78.0 |
| Alkali cellulose formation | Temp.(°C) | 30 | 30 | 30 | 30 | 30 | 30 |
| | Period (minute) | 30 | 30 | 30 | 30 | 30 | 30 |
| MCA addition | Temp.(°C) | below 40 | below 40 | below 40 | below 40 | below 40 | below 40 |
| | Period (minute) | 15 | 15 | 15 | 15 | 15 | 15 |
| Etherification | Temp.(°C) | 70 | 70 | 70 | 70 | 70 | 70 |
| | Period (hour) | 3 | 3 | 3 | 3 | 3 | 3 |
| Properties of CMC | DS | 0.68 | 0.70 | 0.75 | 0.75 | 0.61 | 0.80 |
| | AM | 68 | 70 | 75 | 75 | 76.3 | 66.6 |
| | 1 % viscosity(cps) | 105 | 635 | 62 | 68 | 120 | 70 |
| | PA | 1.88 | 3.08 | 0.90 | 0.88 | 1.30 | 1.13 |

Note:
[1] Experiments 7, 8, 10, 11 and 12 shown in apparent concentrations.
[2] Constitution of solvents.

| Constitution | Expt. | 7 | 8 | 9 | 10 | 11 | 12 |
|---|---|---|---|---|---|---|---|
| Water | | 100 | 50 | 100 | 100 | 100 | 100 |
| Benzene | | 900 | 900 | — | 470 | 470 | 470 |
| Ethanol | | — | — | 900 | 430 | 430 | 430 | in comparison with the pulp used. The compressed alkali cellulose is etherified. Thus, alkali cellulose is introduced into a mexer, and 99.9% isopropanol (1000 parts) is added thereto. The resultant mixture is stirred for 10 minutes and treated as in Experiment 1. Properties of the resulting CMC are as follows: DS, 0.74; AM, 74; 1% viscosity, 45 cps; PA, 0.83.

EXPERIMENT 14.

Into a mixer containing 99.9% isopropanol (1000 parts) and water (100 parts), there is added pulp (purity, 90%; 100 parts), and the resultant mixture is stirred at 25°C for 5 minutes. With stirring, there are added solid Na-MCA (77.6 parts) and 40% aqueous sodium hydroxide solution (70 parts) at the same time to the mixture, which is stirred at 25° to 30°C for 60 minutes. The reaction system is matured at 70°C for 2 hours. The reaction mixture is neutralized with glacial acetic acid. The product is collected by filtration, washed with 80% methanol 3 times and dried. Properties of the resulting CMC are as follows: DS, 0.81; AM, 67.5; 1% viscosity, 250 cps; PA, 0.85.

EXPERIMENT 15.

Into a mixer containing 99.9% isopropanol (1000 parts) and water (100 parts), there is added pulp (purity, 90%; 100 parts), and the resultant mixture is stirred at 25°C for 5 minutes. With stirring, there is added solid MCA (63 parts) to the mixture, which is stirred at 25° to 30°C for 60 minutes. To the slurry while kept at 30° to 35°C, there is added dropwise 40% aqueous sodium hydroxide solution (160 parts) uniformly in 60 minutes. The reaction system is matured at 70°C for 2 hours. The reaction mixture is neutralized with glacial acetic acid, washed with 80% methanol 3 times and dried. Properties of the resulting purified CMC are as follows: DS, 0.75; AM, 62.5; 1% viscosity, 285 cps; PA, 1.05.

What is claimed is:

1. A process for preparing alkali carboxymethyl cellulose having a uniform distribution of the degree of substitution which comprises treating cellulose with an etherifying agent selected from the group consisting of alkali monochloroacetate and lower alkyl monochloroacetate in the presence of water and at least one organic solvent therefor, until the uniform distribution of the etherifying agent into the cellulose is attained, and then adding an alkali to the resulting mixture, said etherifying agent being present in an amount of 0.4 to 2.0 mol per cellulose glucose anhydride unit, and water is used in the amount satisfying the following inequality:

$$\frac{1}{X} \times \frac{72}{89} \leq Y \leq \frac{1}{X} \times \frac{792}{223}$$

wherein Y is the ratio of the weight of water to that of the etherifying agent and X is the mol number of said etherifying agent per cellulose glucose anhydride unit, the weight of the organic solvent is not less than that of water, said alkali being present in not less than an amount equimolar with said alkali monochloroacetate or not less than twice the molar amount of said alkyl monochloroacetate.

2. The process according to claim 1, wherein the etherifying agent is lower alkyl monochloroacetate.

3. The process according to claim 1, wherein water is used in the amount satisfying the following inequality:

$$\frac{1.5}{X} \leq Y \leq \frac{2.5}{X}.$$

4. The process according to claim 1 wherein the organic solvent is isopropanol, ethanol, acetone, benzene, or a mixture of ethanol and benzene.

5. The process according to claim 1 wherein said lower alkyl monochloroacetate is methyl monochloroacetate, ethyl monochloroacetate, propanol monochloroacetate, isopropanol monochloroacetate or butanol monochloroacetate.

6. A process for preparing alkali carboxymethyl cellulose having a uniform distribution of the degree of substitution which comprises treating cellulose with an etherifying agent selected from the group consisting of alkali monochloroacetate and lower alkyl monochloroacetate in the presence of water and at least one organic solvent therefor, until the uniform distribution of the etherifying agent into the cellulose is attained, the etherifying agent being used in an amount of 0.4 to 2.0 mol per cellulose glucose anhydride unit, and adding an alkali to the resultant mixture, the alkali being present in not less than an amount equimolar with alkali monochloroacetate or not less than a twice molar amount to lower alkyl monochloroacetate, followed by treatment at a temperature from room temperature to reflux temperature until the etherification is completed, said water being present in an amount satisfying the following inequality:

$$\frac{1}{X} \times \frac{72}{89} \leq Y \leq \frac{1}{X} \times \frac{792}{223}$$

wherein Y is the ratio of the weight of water to that of the etherifying agent and X is the mol number of said etherifying agent per cellulose glucose anhydride unit, and the weight of the organic solvent is not less than that of water.

7. The process according to claim 6, wherein the etherifying agent is lower alkyl monochloroacetate.

8. The process according to claim 6 wherein water is used in the amount satisfying the following inequality:

$$\frac{1.5}{X} \leq Y \leq \frac{2.5}{X}.$$

9. The process according to claim 6, wherein the organic solvent is isopropanol, ethanol, acetone, benzene or a mixture of ethanol and benzene.

10. The process according to claim 6 wherein said lower alkyl monochloroacetate is methyl monochloroacetate, ethyl monochloroacetate, propanol monochloroacetate, isopropanol monochloroacetate or butanol monochloroacetate.

* * * * *